June 23, 1953 R. H. CLARK 2,642,650
MACHINE TOOL

Filed Sept. 17, 1947 4 Sheets-Sheet 1

INVENTOR.
ROBERT H. CLARK
BY
Kwis, Hudson, Boughton & Williams
ATTORNEYS

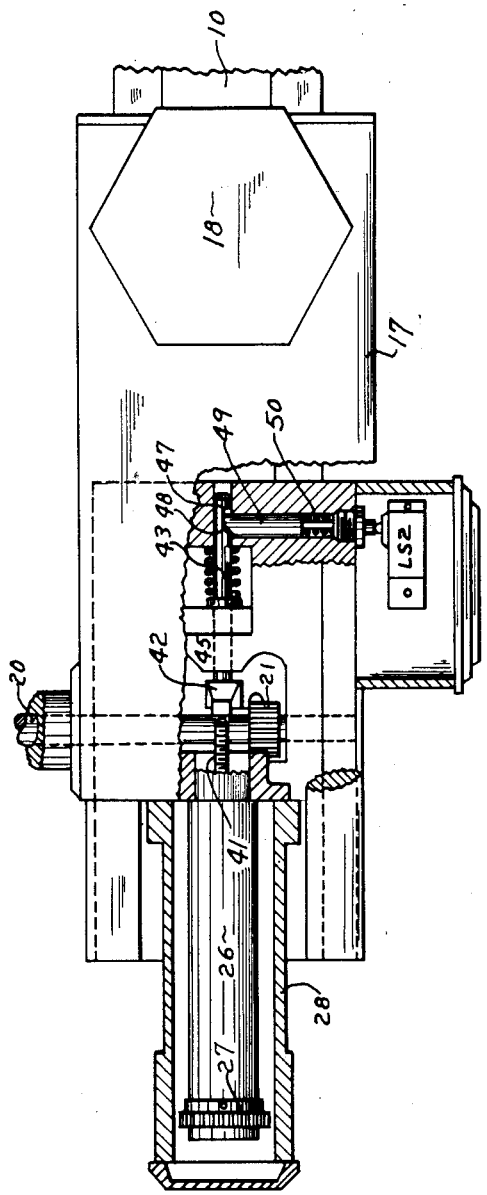
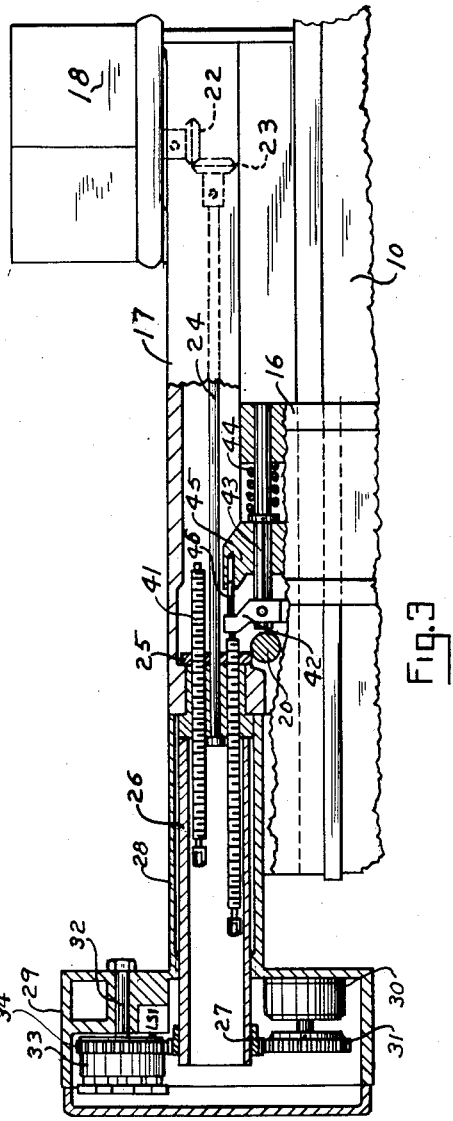

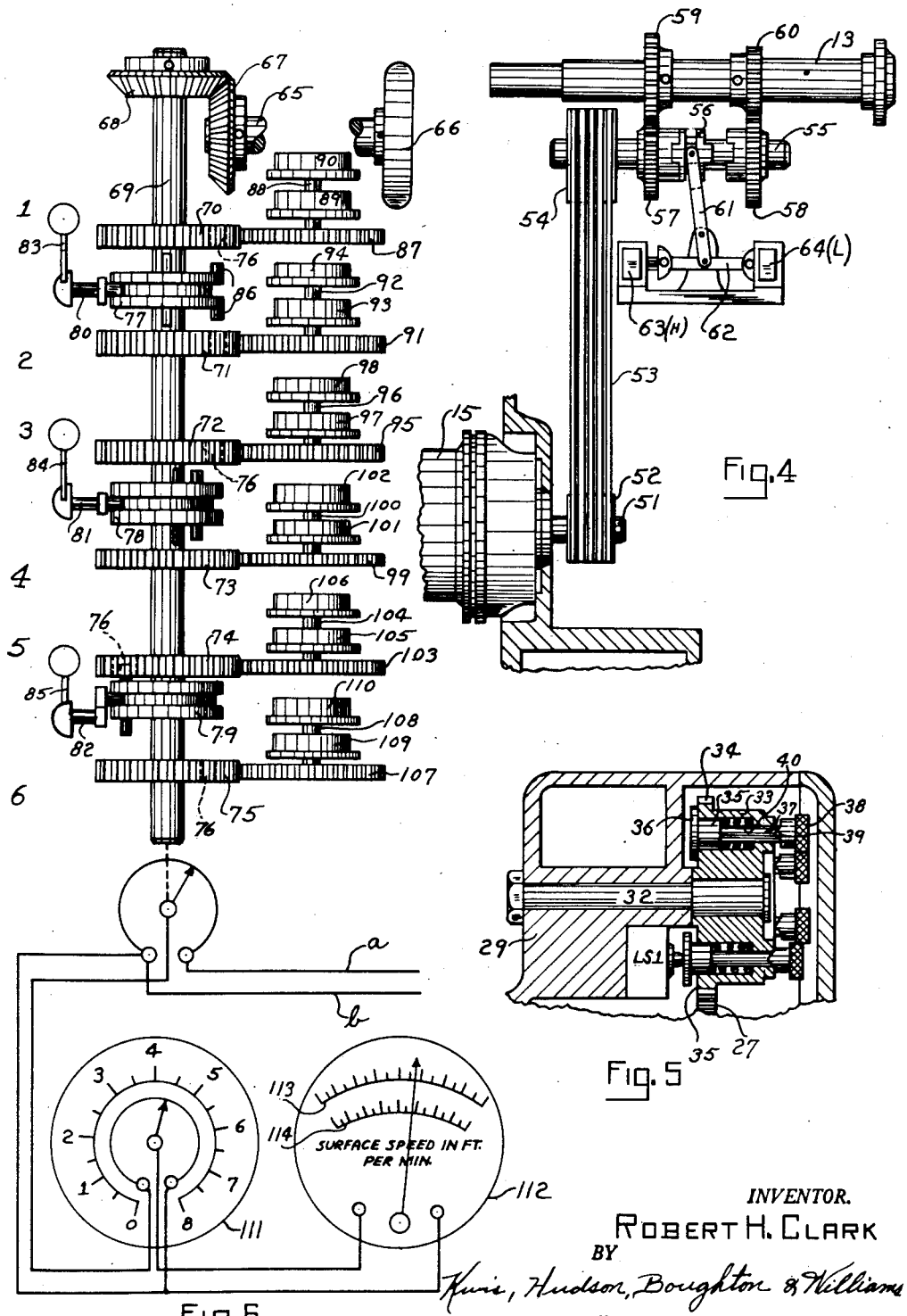

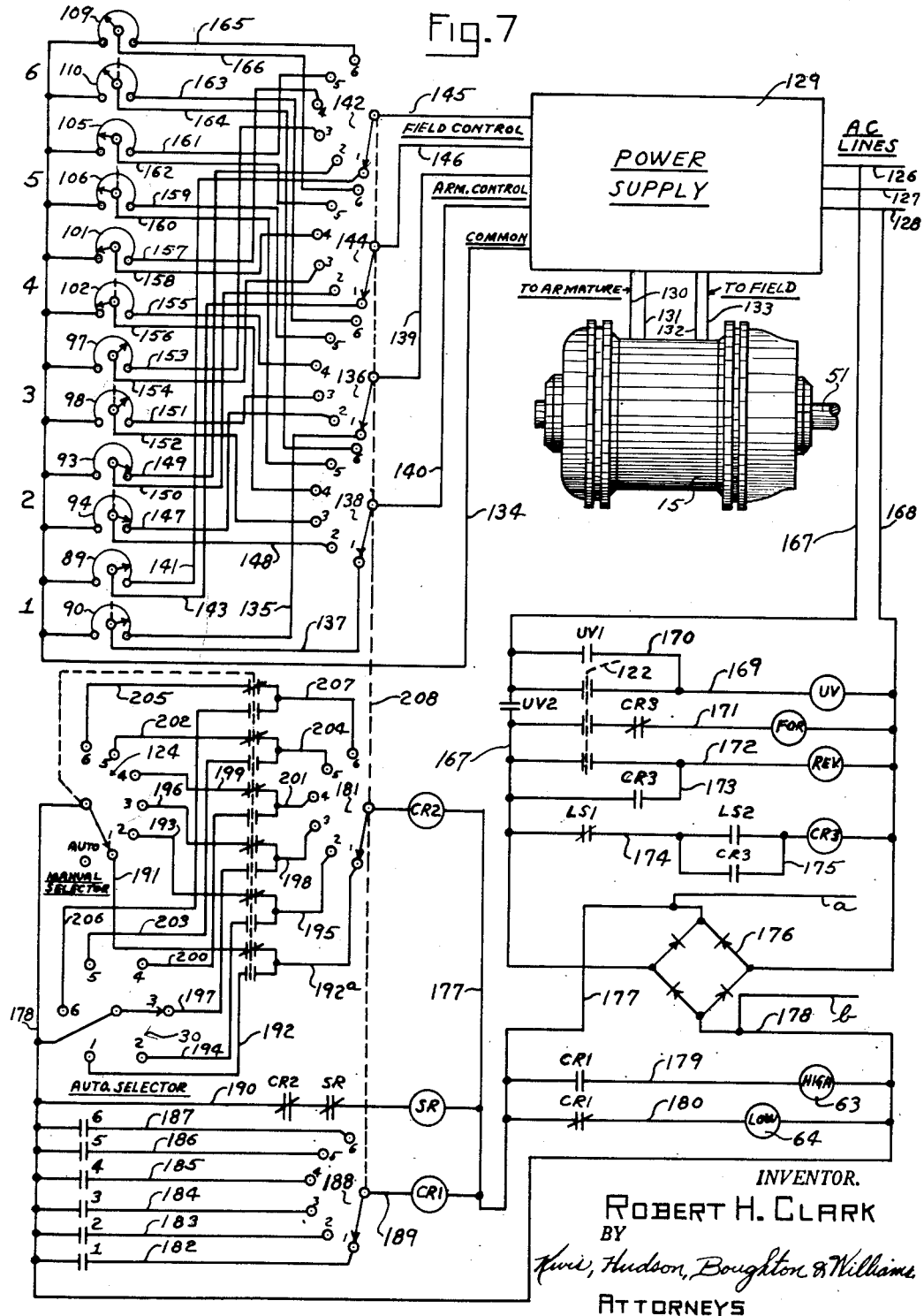

Patented June 23, 1953

2,642,650

UNITED STATES PATENT OFFICE 2,642,650

MACHINE TOOL

Robert Harold Clark, Solon, Ohio, assignor to The Warner & Swasey Company, Cleveland, Ohio, a corporation of Ohio Application September 17, 1947, Serial No. 774,647

14 Claims. (Cl. 29—64)

This invention relates to a machine tool and more particularly to a machine tool of the turret lathe type, although the invention may be applied to other types of machine tools.

An object of the invention is to provide in a machine tool having a part driven at different speeds by a variable speed electric motor, improved and novel means for selecting or preselecting the rate of movement of said part for each operative step of the complete work cycle.

Another object is to provide in a machine tool having a part movable at various rates and driven by an electric motor the speed of which is varied by controlling the voltages to the field and armature thereof, improved and novel means for varying such voltages and including control devices settable to select or preselect the motor speed and the rate of movement of said part for each operative step of a complete work cycle.

A further object is to provide in a machine tool such as specified in the above named objects, means for progressing from one operative step to the next operative step of a work cycle and which means is controlled either automatically or manually as desired.

A still further object is to provide in a machine tool as specified in the last object an arrangement such that the automatic progression from one operative step to the next operative step can be accomplished as desired for any number of operative steps less than the total number of steps of which the machine is capable of operating in a complete work cycle.

A further object is to provide in a machine tool having an electrically actuated movable part, improved and novel means for selecting or preselecting the rates of movement of said part and for controlling the operation of the machine.

A still further object is to provide in a machine tool of the turret lathe type and wherein the work spindle is driven at a plurality of different speeds and in opposite directions by a variable speed reversible electric motor and wherein the turret slide is manually moved and the turret is automatically and mechanically indexed by the slide movement when the slide is near its most rearward position, improved and novel electrical control means for said motor for selecting or preselecting the spindle speeds for the different operative steps of a work cycle, in combination with electrical control means for controlling the direction of operation of said motor and for initiating each operative step of the work cycle and which last named control means is actuated in part by the movement of the slide and in part by the indexing of the turret.

Another object is to provide a machine tool wherein the work spindle is driven by a variable speed reversible electric motor without the usual change speed transmission and wherein the spindle speeds and its direction of rotation may be readily selected or preselected or controlled by means of an electrical control system.

Another object is to provide a machine tool, as specified in the last object, and wherein "high" and "low" speed ranges can be superimposed on the different speeds imparted to the spindle by the motor and which ranges are controlled by the electrical control system.

Further and additional objects and advantages not hereinbefore enumerated will become apparent hereinafter during the detailed description of an embodiment of the invention that is to follow, and which embodiment is illustrated in the accompanying drawings wherein:

Fig. 2 is a plan view of a portion of the bed and turret slide, with certain parts broken away and shown in section;

Fig. 3 is a rear elevational view of a portion of the bed and turret slide, with certain parts broken away and shown in section;

Fig. 4 is a diagrammatic view illustrating the variable speed reversible electric drive motor and the driving connection between said motor and the work spindle and including the arrangement for imparting a "high" or a "low" speed range to said spindle;

Fig. 5 is a fragmentary sectional view through the control housing carried by the turret slide and on a larger scale than the previous views;

Figure 1:
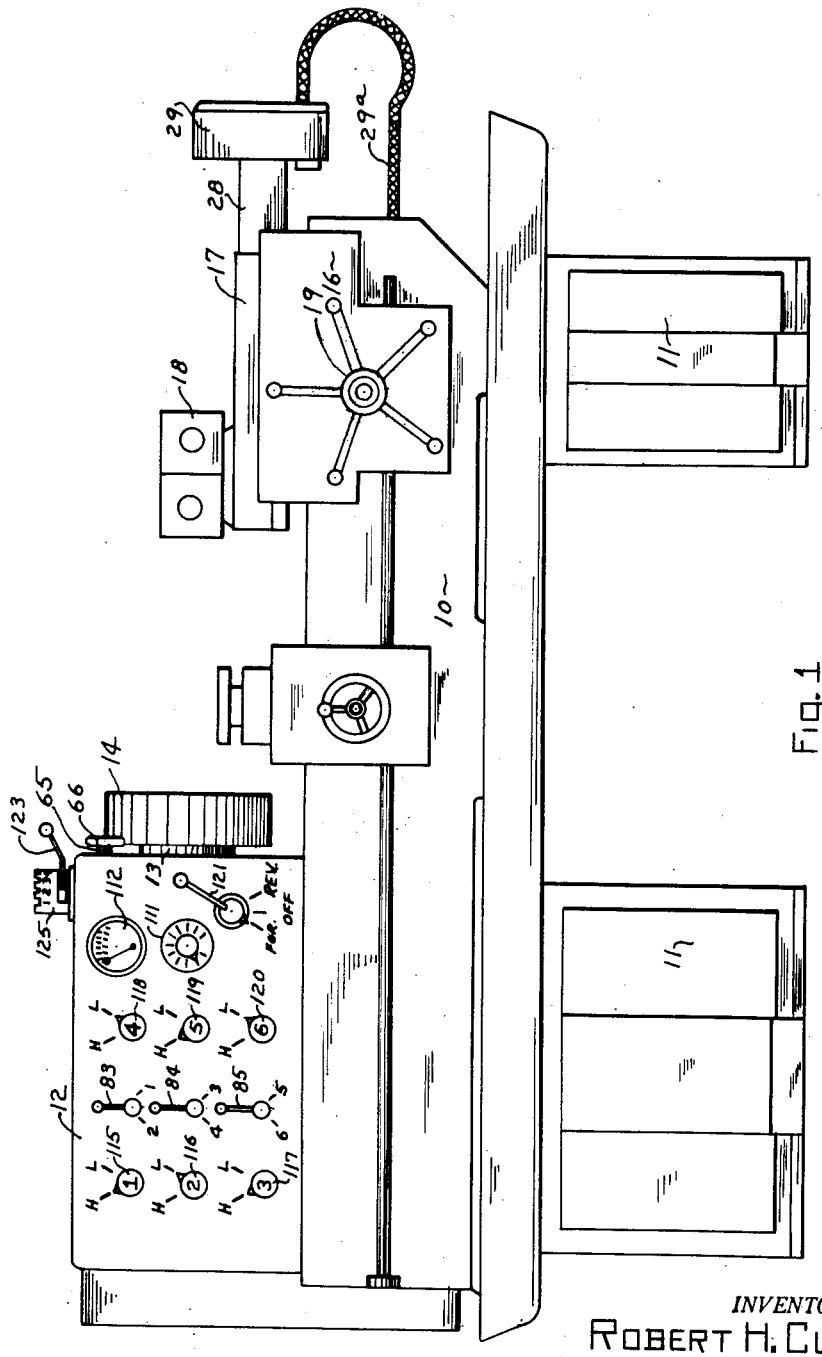
Fig. 1 is a front elevational view of a turret lathe embodying the invention.

Fig. 6 is a schematic illustration of the field and armature control rheostats for the drive motor and of the mechanism for setting said rheostats to select or preselect the spindle speeds for the different operative steps of a work cycle, together with the indicating mechanism for indicating the surface speed in feet per minute for different diameters of work in relation to spindle speeds; and Fig. 7 is a wiring diagram of the motor and control circuits.

Referring to Fig. 1, the machine tool shown therein for illustrative purposes is a turret lathe and comprises a bed 10 supported on spaced legs 11. A headstock 12 is carried by one end of the bed 10 and the movable part which is to be moved at different rates in opposite directions, in this instance a rotatable work spindle 13 having the usual chuck 14, is mounted in said headstock. The work spindle is driven by a reversible variable speed shunt type D. C. motor 15 located in the left-hand leg 11 and operatively connected with the work spindle as will later be explained and as illustrated in Fig. 4.

The bed 10 is provided with longitudinally extending ways on which is adjustably mounted a saddle 16 provided with ways slidably mounting a turret slide 17 which carries an indexible turret 18, all as well understood in the art. The saddle 16, in a manner well known in the art, can be moved to and clamped in adjusted position on the ways of the bed while the turret slide 17 is manually moved on the ways of the saddle by means of a turnstile 19 fixed to a shaft 20, see Fig. 2, and which carries a pinion 21 and is rotatable in the saddle, with said pinion meshing with a rack carried by the underside of the slide as is well known in the art. The turret 18 is indexed when the slide is nearing its rearmost position and the indexing movement of the turret is effected automatically and mechanically by the movement of the slide and the turret is locked and clamped in indexed position by well known mechanism which forms no part of the present invention and need not be illustrated herein.

The central stud of the indexible turret 18 extends into the turret slide 17 and has fixed thereto a bevel gear 22, see Fig. 3, which meshes with a bevel gear 23 fixed to one end of a shaft 24 that extends rearwardly in the slide 17 and passes through and is fixed to a stop roll collar 25. The collar 25 abuts against one side of a bearing boss formed in the turret slide 17 and said collar is rigidly connected to the end of a reduced portion of a stop roll 26 and which reduced portion rotatably interfits said bearing boss while the shoulder on the stop roll at the left hand end of the reduced portion engages the opposite side of the bearing boss from the collar 25, wherefore the stop roll 26 is held against relative endwise movement with respect to the slide 17 but can rotate relative thereto. The stop roll 26 beyond the reduced portion is in the form of a sleeve and the rear end of the stop roll mounts a gear 27 for rotation with the stop roll. The sleeve portion of the stop roll 26 is housed within and rotatably supported by a sleeve 28 attached to the rear end of the turret slide 17.

The sleeve 28 at its outer or free end is provided with a housing portion 29 which mounts a limit switch LS-1 and an automatic operative step selector switch 30 which is of the type having circularly spaced contacts and a revolving hand successively engaging said contacts, see Fig. 7. The rotatable actuating shaft for the hand of the switch 30 has fixed thereto a gear 31 which constantly meshes with the gear 27 on the stop roll 26, thus the revolving hand of the switch 30 will be successively moved into engagement with the contacts thereof during the indexing of the turret 18 and the stop roll 26, it being understood that each contact of said switch is correlated to a face of the turret and represents an operative step of the work cycle. The limit switch LS-1 mounted in the housing 29 is a normally closed switch and is actuated to open the same by the means now to be described.

A stationary shaft 32 parallel to the axis of the stop roll is mounted in the housing 29 and has rotatably mounted on it a drum 33 which has on its periphery a gear 34 meshing with the gear 27, wherefore the indexing of the turret and stop roll indexes said drum (see Figs. 3 and 5). The drum 33 is provided with six equally and circularly spaced counterbores in which are slidably mounted plungers 35 having on their outer ends actuating disks 36 which function when the plungers are in extended position and during the indexing of the drum 33 to engage and depress the button of the switch LS-1 to open the contacts of said switch. The inner ends of the plungers 35 are integrally connected to reduced rods 37 which extend slidably outwardly of the drum 33 and have fixed on their outer ends knobs 38. These knobs on their sides adjacent to the drum 33 are provided with V-shaped raised portions 39 which when the knobs are rotated can be brought into position to engage the outside of the drum, at which time the plungers are held retracted or can be positioned to fit into V-shaped grooves formed in the outer side of the drum, at which time the plungers are extended. Coil springs 40 located in the counterbores surround the rods 37 and abut the plungers 35 and act when the raised portions 39 of the knobs are in the V-shaped grooves to move the plungers to their extended position at which time the disks 36 thereof are in position to depress the button of the switch LS-1 as the drum 33 indexes and to hold the button depressed until the drum is again indexed. It will be understood that the plungers 35 can thus be positioned in either the extended switch actuating position as indicated by the lower plunger in Fig. 5 or can be retracted as indicated by the upper plunger 35 in Fig. 5 and in which latter position the actuating disk 36 does not contact the button of switch LS-1, and hence as the drum indexes this disk does not depress the button. As already stated there are six of the plungers 35 corresponding to the maximum number of operative steps in the complete work cycle and to the six faces of the turret 18. Therefore, each time the turret 18 is indexed the drum 33 is correspondingly indexed and the switch LS-1 is actuated or not, depending upon the position of the respective knob 38.

The reduced portion of the stop roll 26 is provided with six circularly spaced threaded openings arranged concentrically around the shaft 24 and which have adjustably mounted therein stop screws 41 (see Figs. 2 and 3). The rear ends of the stop screws are provided with wrench receiving portions accessible through the sleeve portion of the stop roll 26 when the cover of the housing 29 is open. During the forward movement of the slide for any face of the turret the correlated stop screw 41 near the end of said forward movement engages a movable block 42 fixed to a plunger 43 which is slidable in a bore of the saddle 16 and which plunger is normally held in extended position toward the rear of the machine by a spring 44. As the slide completes its forward movement the block 42 and the plunger 43 are moved by the particular stop screw against the action of the spring 44 until the block positively abuts the face of a stop boss 45 on the saddle to positively arrest forward movement of the slide. It will be noted that the block 42 carries a pin 46 which slides in an opening in the boss 45 and acts to hold the block 42 and plunger 43 against turning movement.

The plunger 43 is provided with a stepped recess 47 formed with two lands that are interconnected by a camming portion 48. When the plunger 43 is in its normal and extended left-hand position (as viewed in the drawings), the tapered and enlarged end of a switch actuating rod 49 slidably supported by the saddle is extended into the stepped recess 47 with the end of said rod in contact with the lower land thereof. A spring 50 functions to hold the rod 49 in this extended position and the opposite and reduced end of the rod is aligned with the actuating button of a limit switch LS-2. As the plunger 43 is moved toward the right against the action of the spring 44 by the engagement of a stop screw 41 with the block 42 as the slide approaches its most forward position, the camming portion 48 of the recess 47 contacts the beveled end of the rod 49 and said rod is cammed against the action of its spring 50 and depresses the switch button and actuates limit switch LS-2. Since limit switch LS-2 is a normally open switch this actuation effects closing of the switch. It will be recalled that the plungers in the drum 33 function to actuate normally closed limit switch LS-1 as the turret is indexed. The actuation or non-actuation of limit switch LS-1 when the slide is in its rear turret indexing position conditions the circuit to render the actuation of limit switch LS-2 an active or an idle actuation as the case may be, as will be pointed out hereinafter in the detailed description of the wiring diagram of Fig. 7. It will be understood that each time the slide moves forward switch LS-2 is actuated, and depending upon whether or not switch LS-1 is closed or open the actuation of switch LS-2 functions to effect reversal or no reversal of rotation of the motor 15 and the work spindle. The wires which connect the automatic selector switch 30 and the limit switches LS-1 and LS-2 into the control circuit extend from said switches to the headstock through flexible cable 29a.

The electrically actuated drive for rotating the work spindle at different speeds and the mechanism for selecting or preselecting the different speeds will now be explained. As already stated the spindle drive motor 15 is of the variable speed reversible D. C. shunt wound type and the motor shaft 51 mounts a pulley 52 around which extends a suitable drive belt 53 that also extends around a pulley 54 fixed to a rotatable shaft 55 mounted in the headstock. The shaft 55 has splined to it a shiftable clutch member 56 which can be shifted selectively into engagement with clutch portions formed on gears 57 and 58 freely rotatable on the shaft 55. The gears 57 and 58 mesh respectively with gears 59 and 60 fixed on the work spindle. It thus will be seen that in addition to the different speeds imparted to the work spindle by the variable speed motor 15, "high" and "low" speed ranges can be imparted thereto depending upon which of the gears 57 and 58 is clutched to the shaft 55. The shiftable clutch member 56 is shifted to either of its two operative positions, i. e. its "high" or its "low" position, by means of a pivoted arm 61 having at one end a yoke portion straddling the clutch member 56 and provided with shoes engaging with an annular groove formed in said member. The other end of the arm 61 is pivotally connected to an actuating bar 62 that is connected to the armatures of solenoids 63 and 64. It will be seen that when the "high" speed range solenoid 63 is energized the clutch member 56 will be clutched to gear 58 to produce the "high" speed range for the spindle and that when the "low" speed range solenoid 64 is energized the clutch member 56 will be clutched to the gear 57 to produce the "low" speed range for the spindle. The manner in which the solenoids 63 and 64 are energized and de-energized will be explained in connection with the wiring diagram of Fig. 7.

The various speeds of rotation of the work spindle for the different operative steps of a work cycle may be selected or preselected by the mechanism now to be explained. The headstock rotatably mounts a shaft 65 which projects outwardly of the end of the headstock adjacent to the chuck 14 and has fixed thereto a handwheel 66 (see Figs. 1 and 6). The inner end of the shaft 65 has fixed thereto a bevel gear 67 which meshes with a bevel gear 68 fixed on the upper end of a vertically extending shaft 69 that is rotatably supported in the headstock. The shaft 69 has freely rotatable thereon three pairs of gears, namely the gears 70 and 71 forming one pair, the gears 72 and 73 forming the second pair, and the gears 74 and 75 forming the third pair. The gears 70 and 71 of the first pair are related, respectively, to operative steps 1 and 2, the gears 72 and 73 of the second pair are related, respectively, to operative steps 3 and 4, and the gears 74 and 75 of the third pair are related, respectively, to operative steps 5 and 6 of the work cycle. Each gear of the three pairs of gears is provided inwardly of its circumference with an axially extending opening 76 for a purpose soon to be apparent. Splined to the shaft 69 intermediate the gears of the three pairs of gears are shiftable clutch members 77, 78, and 79 normally spring held in intermediate disengaged position. These clutch members are shifted selectively axially of the shaft 69 from the intermediate disengaged position to either one of two engaged positions by means of crank levers 80, 81 and 82 rockably supported in the front side of the headstock and having at their inner ends within the headstock crank arms engaging in annular grooves in the clutch members 77, 78 and 79. The crank levers 80, 81 and 82 exteriorly of the front of the headstock have handle portions 83, 84 and 85, respectively, and which handle portions extend vertically when the clutches are disengaged (see Fig. 1). Each of the clutch members 77, 78 and 79 is provided on its opposite sides with axially extending pins 86 adapted to be engaged selectively in the openings 76 of the gears adjacent to said clutch member. Thus it will be seen that the hand wheel 66 can be rotated to rotate the shaft 69 and the clutches splined on said shaft bring the pins of a particular clutch into axial alignment with the openings 76 of the gears adjacent to said clutch, after which axial shifting movement of said clutch in either direction will effect engagement of one or the other of its pins 86 in the opening of one or the other of the respective pair of gears. Therefore, the gear 70 correlated to the first operative step of the work cycle may be clutched to the shaft 69 for rotation therewith or the gear 71 correlated to the second operative step can be clutched to said shaft depending upon the direction of movement of the lever 83. Similarly the gear 72 for the third operative step or the gear 73 for the fourth operative step can be clutched to the shaft 69 depending upon the direction of movement of the lever 84 and likewise the gear 74 for the fifth operative step and the gear 75 for the sixth operative step can be selectively clutched to the shaft by properly rocking the lever 85.

The first operative step gear 70 meshes with a gear 87 that is fixed to a shaft 88 that actuates rheostats 89 and 90 which are of the type having a revolving contact hand wiping over a resistance coil. The second operative step gear 71 meshes with a gear 91 fixed to a shaft 92 that actuates similar rheostats 93 and 94. The third operative step gear 72 meshes with a gear 95 fixed to a shaft 96 that actuates similar rheostats 97 and 98. The fourth operative step gear 73 meshes with a gear 99 fixed on a shaft 100 that actuates similar rheostats 101 and 102. The fifth operative step gear 74 meshes with a gear 103 fixed on a shaft 104 that actuates similar rheostats 105 and 106. The sixth operative step gear 75 meshes with a gear 107 fixed on a shaft 108 that actuates similar rheostats 109 and 110. The even numbered rheostats 90, 94, 98, 102, 106 and 110 control the voltages of the armature windings of the motor 15 for each step in the work cycle, respectively, while the odd numbered rheostats 89, 93, 97, 101, 105 and 109 control the voltages of the field windings of the motor for each operative step of the cycle.

The shaft 69 is operatively connected with an electrical indicating mechanism which is responsive to the rotation of said shaft by the hand wheel 66 and which indicates the surface or cutting speeds of a tool operating on the rotating workpiece in relation to different diameters at which the tool is cutting. The indicating mechanism may be electrically connected by wires $a$ and $b$ to the D. C. control circuit of Fig. 7, preferably having a regulated voltage. The indicating mechanism need not be described herein since it is fully illustrated and described in my Patent No. 2,419,120, issued April 15, 1947. It will suffice to point out that the dial 111 on the front of the headstock indicates work diameters in inches at which the tool is cutting while the dial 112 on the front of the headstock represents the surface or cutting speed in feet per minute in relation to the R. P. M. and the diameter of the work. It will be noted that the dial 112 includes two scales, namely, the scale 113 for "high" speed range operation of the spindle and the scale 114 for the "low" speed range operation thereof. The hand associated with the dial 111 is settable manually, while the hand on the dial 112 is automatically moved.

The spindle speeds for each operative step in the work cycle may be selected upon the completion of the preceding step or the spindle speeds for all of the operative steps in the work cycle may be preselected prior to initiating the work cycle. The explanation now to be set forth relates to the last mentioned instance. The operator manually turns the hand of the dial 111 to the diameter required to be machined on the workpiece in the first operative step by rotating the dial knob (see Fig. 1). He then turns the hand wheel 66 to rotate the shaft 69 and simultaneously moves the lever 83 to shift the clutch member 77 until the pin on the side of the clutch member adjacent to the gear 70 engages in the opening 76 in said gear whereupon the gear 70 is clutched to the shaft 69. The operator continues to rotate the hand wheel 66 in one or the other direction while maintaining the lever 83 in its moved position, and he observes the dial 112 until the pointer indicates the cutting or surface speed in feet per minute on one or the other of the scales 113 and 114 and which cutting speed is that desired for the first operative step. Thereupon, he stops rotation of the hand wheel 66 and rocks the lever 83 to its intermediate position to shift the clutch member 77 to its intermediate position, at which time the gear 70 is disconnected from the shaft 69. It will be understood that the rotation imparted to the gear 70 has rotated the gear 87 and has actuated the rheostats 89 and 90 to vary the voltages of the field and armature windings of the motor 15 so that the circuit to said motor will be conditioned for motor operation at the desired speed. If the desired surface or cutting speed in feet per minute as indicated on the dial 112 appeared on the scale 113 for "high" range operation or on the scale 114 for "low" range operation, as the case might be, the operator turns the hand knob 115 on the front of the headstock to the proper high or low range position as required to actuate the No. 1 step high or low range switch as will later be explained in connection with the diagram of Fig. 7. In a similar manner the operator may preselect the spindle speeds for the other operative steps in the work cycle, first manually turning the hand of the dial 111 to the desired diameter, then clutching the proper gear to the shaft 69 and turning the hand wheel 66 while observing the dial 112 until the field and armature rheostats correlated to each operative step have been properly adjusted, it being understood that in preselecting the spindle speed to operative steps 2 to 6 inclusive the operator will also manually and properly set the knobs 116, 117, 118, 119 and 120 to actuate the respective high and low range switches correlated to operative steps 2 to 6 inclusive.

The front of the headstock also is provided with a rockable lever 121 which actuates a forward and reverse and neutral switch diagrammatically shown in Fig. 7, at 122 and which contains three sets of contacts, namely under voltage contacts, forward contacts and reverse contacts all three of which are open when the lever 121 is in "off" position. When the lever 121 is in "forward" or "reverse" position, the respective forward or reverse contacts will be closed in addition to the under voltage contact.

It has already been explained that at the end of one operative step when the slide 17 is in its rearmost position and the turret 18 has indexed, that the automatic selector switch 30 may function to automatically initiate the spindle operation for the next operative step at the preselected speed. In place of employing the automatic selector switch 30 it may be desired for various reasons, as for instance setting up the machine or for machining a single workpiece, to have the spindle operation for the new operative step manually initiated after the completion of the previous operative step. For this purpose a lever 123 is rockably mounted on the top of the headstock and actuates a manual selector switch 124, see Fig. 7, and which switch is of the type having circularly spaced contacts and a revolving hand successively engaging said contacts, it being understood that the movement of the lever 123 effects movement of said hand. The manual selector switch embodies seven contacts, six of which are correlated to the six operative steps of the work cycle while the seventh contact is designated as "auto" contact. When the hand is in engagement with this "auto" contact, the hand selector switch is out of the control circuit and the machine can only function with the automatic selector switch. Operatively associated with the lever 123 on the top of the headstock is a segmental indicator 125 provided with numbers indicating the contacts of the manual selector switch 124 to show when the lever is in the desired position for a particular step of the cycle or for automatic operation of the machine.

The diagram of the motor and control circuits shown in Fig. 7 will now be explained. As already explained, the motor 15 is of the reversible adjustable speed shunt wound D. C. type and includes the usual field and armature windings. The motor 15 is energized from a suitable source of alternating electric power represented by the lines 126, 127 and 128, and which power is converted to direct current. These lines 126, 127 and 128 extend to a power supply or rectifying unit 129 of conventional type and which may be a motor generator set, thyratron tubes or other means for rectifying the alternating current to direct current and controlling the magnitude of it. The current is conducted from the power supply unit to the armature winding of the motor 15 by the lines 130 and 131, while the current for the field winding of the motor is conducted thereto from the power supply unit by the lines 132 and 133. In order to control the speed of the motor by varying the voltages of the field and armature, the rheostats 89, 93, 97, 101, 105 and 109 and the rheostats 90, 94, 98, 102, 106 and 110 are employed as already referred to. The various rheostats are connected to a conventional stepping switch with a plurality of switch banks and wiping contacts as hereinafter described. A common line 134 for both the field and armature control extends from the power supply unit to said rheostats, one end of the coil resistance elements thereof being connected to said common wire. The opposite end of the coil resistance element of the rheostat 90 is connected to a wire 135 which extends to the No. 1 contact of an automatic stepping switch bank 136 of conventional and well known type. The wiping contact arm of rheostat 90 is connected by wire 137 to the No. 1 contact of a similar automatic stepping switch bank 138. The wiper arms of the stepping switch banks 136 and 138 are connected respectively by wires 139 and 140 to the armature control portion of the power supply unit. The resistance coil of rheostat 89 as stated has one end connected to the common wire 134 while the opposite end thereof is connected by wire 141 to the No. 1 contact of a similar stepping switch bank 142. The wiper arm of rheostat 89 is connected by wire 143 to the No. 1 contact of a similar stepping switch 144. The wiper arms of stepping switches 142 and 144 are connected, respectively, by wires 145 and 146 to the field control portion of the power supply unit 129. Stepping switch banks 136 and 138 may be termed armature control stepping switch banks, while the stepping switch banks 142 and 144 may be termed the field control stepping switch banks. The resistance coil of rheostat 94 is connected by wire 147 to the No. 2 contact of stepping switch bank 136. The wiping arm of rheostat 94 is connected by wire 148 to the No. 2 contact of stepping switch bank 138. The resistance of rheostat 93 is connected by wire 149 to the No. 2 contact of stepping switch bank 142, while the wiper arm of said rheostat is connected by wire 150 to the No. 2 contact of stepping switch bank 144. The resistance of rheostat 98 is connected by wire 151 to the No. 3 contact of stepping switch bank 136 while the wiper arm thereof is connected by wire 152 to the No. 3 contact of stepping switch bank 138. The resistance and wiping arm of rheostat 97 are connected respectively by wires 153 and 154 to the No. 3 contacts of stepping switch banks 142 and 144. The resistance and wiping arm of rheostat 102 are connected respectively by wires 155 and 156 to the No. 4 contacts of stepping switch banks 136 and 138. The resistance and wiper arm of rheostat 101 are connected respectively by wires 157 and 158 to the No. 4 contacts of stepping switch banks 142 and 144. The resistance and wiper arm of rheostat 106 are connected respectively by wires 159 and 160 to the No. 5 contacts of stepping switch banks 136 and 138. The resistance and wiper arm of rheostat 105 are connected respectively by wires 161 and 162 to the No. 5 contacts of stepping switch banks 142 and 144. The resistance and wiper arm of rheostat 110 are connected respectively by wires 163 and 164 to the No. 6 contacts of stepping switch banks 136 and 138. The resistance and wiping arm of rheostat 109 are connected respectively by wires 165 and 166 to the No. 6 contacts of stepping switch banks 142 and 144. It will thus be seen that the stepping switch banks 142 and 144 function in conjunction with the rheostats 89, 93, 97, 101, 105 and 109 to regulate the field voltage required for each operative step in order to produce the desired speed. It will also be understood that the stepping switch banks 136 and 138 similarly function in conjunction with the rheostats 90, 94, 98, 102, 106 and 110 to regulate the armature voltage required for each operative step in order to obtain the desired motor and spindle speed. It will be recalled that the field and armature rheostats for each step in the cycle are actuated by common actuating means and are thus set simultaneously.

The power supply lines 126 and 128 are connected to wires 167 and 168 of the A. C. control circuit. The wires 167 and 168 of the A. C. control circuit are interconnected by wire 169 containing under voltage relay UV and the under voltage contacts of the forward and reverse switch 122. The wire 169 intermediate the relay UV and the under voltage contacts of switch 122 is connected by wire 170 with wire 167 and said wire 170 contains normally open contacts UV1. The wires 167 and 168 are interconnected by wire 171 containing the forward contactor coil, normally closed contacts CR3, and the forward contacts of the forward and reverse switch 122. The wire 167 intermediate the points at which the wires 169 and 171 are connected thereto contains normally open contacts UV2. The wires 167 and 168 are interconnected by wire 172 containing the reverse contactor coil and the reverse contacts of the forward and reverse switch 122. The forward contactor coil in wire 171 and the reverse contactor coil in wire 172, respectively, operate when energized the forward and reverse motor contacts which may be in the unit 129, as will be well understood. The wire 172 is connected intermediate said reverse contactor coil and said reverse contacts to wire 167 by wire 173 containing normally open contacts CR3. The wires 167 and 168 are interconnected by wire 174 containing normally closed limit switch LS-1, normally open limit switch LS-2, and contactor coil CR3. A holding circuit 175 around limit switch LS-2 contains normally open contacts CR3.

The wires 167 and 168 extend to a bridge rectifier 176, and from said rectifier extend the wires 177 and 178 of the D. C. control circuit. The wires 177 and 178 of the D. C. control circuit are interconnected by wires 179 and 180 containing, respectively, "high" speed range solenoid 63 and normally open contact CR1 and "low" speed range solenoid 64 and normally closed contact CR1. The wire 177 extends to and is connected with the wiper arm of the automatic stepping switch bank 181 similar to the stepping switch banks previously described and said wire 177 contains relay CR2. The wire 178 extends to and is electrically connected with the wiper arms of the automatic selector switch 30 and the manual selector switch 124. Wires 182, 183, 184, 185, 186 and 187 are connected to the extended wire 178 of the D. C. control circuit and to the six contacts, respectively, of another similar automatic stepping switch 188. The wires 182 to 187 inclusive contain, respectively, the normally open contacts 1, 2, 3, 4, 5 and 6 of the switches which are actuated by the knobs 115 to 120 inclusive on the front of the headstock and which switches control the selection of the "high" and "low" speed ranges, it being recalled that when said knobs are in the "low" speed range positions, said contacts 1 to 6 inclusive are open, but when in the "high" speed range positions said contacts are closed. The wiper arm of the stepping switch 188 is connected by wire 189 with the extended wire 177 and said wire 189 contains relay CR1. The extended wires 177 and 178 are interconnected by wire 190 containing normally closed contacts CR2 and SR and relay coil SR.

The No. 1 contacts of the manual selector switch 124 and the automatic selector switch 30 are connected, respectively, by wires 191 and 192 to a wire 192a which extends to and is connected with the No. 1 contact of stepping switch bank 181. The No. 2 contacts of switches 124 and 30 are connected, respectively, to wires 193 and 194 which are connected to wire 195 that is connected, in turn, to the No. 2 contact of stepping switch bank 181. The No. 3 contacts of switches 124 and 30 are connected, respectively, by wires 196 and 197 to a wire 198 which is connected to the No. 3 contact of stepping switch bank 181. The No. 4 contacts of switches 124 and 30 are connected, respectively, by wires 199 and 200 to wire 201 which is connected to the No. 4 contact of stepping switch bank 181. The No. 5 contacts of switches 124 and 30 are connected, respectively, to wires 202 and 203 which are connected to wire 204 that extends to the No. 5 contact of stepping switch bank 181. The No. 6 contacts of switches 124 and 30 are connected, respectively, to wires 205 and 206 which extend to wire 207 that is connected to the No. 6 contact of stepping switch bank 181. The wires 191, 192, 193, 194, 196, 197, 199, 200, 202, 203, 205 and 206 connected to the respective contacts of switches 124 and 30 contain the contacts of a multi-contact switch which is mechanically actuated by the contact moving arm shaft of the manual selector switch 124. Those contacts of this mechanically actuated switch which are in the wires connected to contacts 1 to 6 inclusive of switch 124 are closed when the contact arm of said switch 124 is in engagement with any of said contacts 1 to 6 thereof. At the same time those contacts of the mechanically actuated switch in the wires connected to the contacts of the automatic selector switch 30 are open. However, when the contact arm of the manual selector switch 124 is moved into engagement with the "auto" contact thereof, then said mechanically actuated switch is thrown to open all of its contacts in the wires connected to switch 124 and to close all of its contacts to the wires connected to switch 30. In other words, when the contact arm of switch 124 engages the "auto" contact thereof, said switch 124 is out of the control circuit and the automatic selector switch 30 is in the control circuit. Conversely, when the contact arm of the manual selector switch 124 is in contact with any of its contacts 1 to 6 inclusive, then said switch 124 is in the control circuit and the automatic selector switch 30 is out of the control circuit. The automatic stepping switch banks 136, 138, 142, 144, 181 and 188 all have their wiper arms operatively interconnected for simultaneous movement as indicated diagrammatically by the dash line 208.

A resume covering the setup and operation of the machine will now be set forth to clarify and coordinate the preceding description. It will be assumed that the main switch of the A. C. power lines 126, 127 and 128 is closed and that the machine is to operate automatically with six operative steps in the complete work cycle. It will also be assumed that the forward and reverse control lever 121 is in the off position and that the turret slide 17 is in its most rearward position with the turret indexed to No. 1 face. It will also be assumed that the operator has properly adjusted the stop screws 41 for each operative step in the work cycle.

The operator now manually sets the hand of dial 111 to the maximum diameter at which the work piece is to be machined for the first operative step. He then turns the hand wheel 66 to rotate the shaft 69 until the opening 76 in the gear 70 is aligned with the adjacent pin on the clutch member 77, whereupon he moves the lever arm 83 to the No. 1 position to interengage said pin with said opening to clutch the gear 70 to the shaft 69. While retaining the lever 83 in the No. 1 position, he rotates the hand wheel 66 in the proper direction to rotate through gear 87 the rheostats 89 and 90 controlling the field and armature of the main drive motor 15. While rotating the hand wheel 66 he observes the dial 112 until the hand thereof indicates the desired surface or cutting speed of the tool in feet per minute for the first step, whereupon he stops rotating the hand wheel 66 and allows the lever 83 and clutch member 77 to return to intermediate position to disengage the clutch member 77 from the gear 70. If the desired surface speed in feet per minute appeared on the "high" speed range scale 113 of the dial 112, he turns knob 115 to the "high" speed range position to close the contacts 1 in wire 182. He has now preselected the spindle speed for the first operative step.

He similarly preselects the spindle speeds for operative steps 2 to 6, inclusive, by rotating the hand wheel 66 and by moving the levers 83, 84 and 85, respectively, in the proper directions to clutch gears 71, 72, 73, 74 and 75 successively to the shaft 69 to give the desired settings to the rheostats 94, 93; 98, 97; 102, 101; 106, 105; 110, 109. In preselecting the spindle speed for each of operative steps 2 to 6, inclusive, the operator also will properly set knobs 116 to 120, inclusive, for the "high" or "low" speed range, as the case may be. As already stated, the first operative step will be in the "high" speed range and it will be assumed that the second operative step is in the "low" speed range, while the third operative step is in the "high" speed range. Thus, contacts 2 in wire 183 will be open, while contacts 3 in wire 184 will be closed. It is thought unnecessary to explain in detail the setup for the operative steps of the work cycle beyond the third step inasmuch as the setup and operation of the machine for these subsequent steps will be apparent.

It will be assumed that during the first operative step, the work spindle will continue to operate in the forward direction during the return movement of the turret slide, therefore, the knob 38 of plunger 35 correlated to the first operative step and carried by the indexible drum 33 is set in extended position so that its disk 36 is in engagement with the button of normally closed limit switch LS1 and said switch is held open during the forward and return movements of the slide in the first operative step.

It will be assumed that during the return movement of the slide in the second operative step, it is desired to have the rotation of the spindle reversed and, therefore, the operator sets the knob 38 on the drum 33 which corresponds to the second operative step in retracted position so that the disk 36 of No. 2 plunger 35 is inactive with respect to the button of limit switch LS1 and said switch remains closed throughout the second operative step and the control circuit is conditioned to effect motor reversal when switch LS2 is actuated.

It will further be assumed that in the third operative step, there is to be no reversal of the work spindle and consequently the No. 3 knob 38 of the drum 33 is positioned so that its plunger 35 is extended and said switch LS1 is held open throughout the third operative step.

The knobs 38 of the drum 33 corresponding with operative steps 4 to 6, inclusive, may be correspondingly positioned depending upon whether or not it is desired to reverse the spindle operation during the return movement of the slide in each of said operative steps 4 to 6, inclusive.

Assuming that a work piece is mounted in the chuck 14, the operator moves the lever 123 of the manual selector switch 124 to "Auto" position to cut manual control function of said switch out of the circuit and to bring therein the automatic selector switch 30. He then throws lever 121 from the "off" position to the "forward" position to actuate the forward and reverse switch 122 and close the under voltage contacts thereof in wire 169 and the forward contacts thereof in wire 171, it being understood that the reverse contacts of said switch 122 in wire 172 are open. The closing of the under voltage contacts of switch 122 in wire 169 energizes under voltage relay UV, whereupon under voltage contacts UV1 in holding circuit 170 are closed and contacts UV2 in wire 167 are closed to establish the A. C. control circuit and the D. C. control circuit. The closing of the forward contacts of switch 122 in wire 171 of the A. C. control circuit energized the forward contactor coil of the control for the motor 15 and closed the forward contacts thereof. It will be recalled that knob 115 for the first operative step was set in the "high" speed range position and hence contacts 1 in wire 182 of the D. C. control circuit were closed, therefore, the D. C. control circuit extends from wire 178 through wire 182, the No. 1 contact of stepping switch bank 188 through the wiper arm of said switch, and wire 189 to wire 177. Relay coil CR1 in wire 189 is now energized, thus closing normally open contacts CR1 in wire 179 and energizing "high" speed range solenoid 63 in said wire. The energization of relay coil CR1 opened normally closed contact CR1 in wire 180 thus deenergizing the "low" speed solenoid 64 in said wire. The energization of solenoid 63 and the deenergization of solenoid 64 shifted the clutch member 56 to clutch the gear 58 to shaft 55 and disconnected the gear 57 from said shaft.

The wiper arm of the automatic selector switch 30 is in contact with No. 1 contact thereof and said contact is connected through wires 192 and 192a with the No. 1 contact of stepping switch 181. The contact arm of stepping switch 181 being in contact with the live No. 1 contact thereof, relay coil CR2 in wire 177 is energized and hence normally closed contact CR2 in wire 190 is opened and, therefore, stepping switch relay coil SR in wire 190 is deenergized, hence the movable contact arms of all of the stepping switch banks; namely, banks 136, 138, 142, 144 and 181 and 188 remain in contact with the No. 1 contacts of said switches. Therefore, the field control rheostat 89 for the first operative step is connected through stepping switch banks 142 and 144 with the field control of the motor 15. Similarly the armature control rheostat 90 for the first operative step is connected through the No. 1 contacts of stepping switch banks 136 and 138 with the armature control of the main drive motor 15. Consequently the work spindle 13 will be rotating at the preselected speed in the forward direction and in the "high" speed range.

The operator now manually turns the turnstile 19 to move the turret slide 17 forwardly until the tool on the No. 1 face of the turret engages the work piece and commences the machining operation. The operator continues to manually move the turret slide forwardly until the No. 1 stop screw 41 engages the slide block 42 and moves said block and plunger 43 until the block is positively stopped by the boss 45, at which time the forward movement of the turret slide is positively arrested. This movement of the block 42 and plunger 43 actuates normally open limit switch LS2 to close the same but since the No. 1 knob 38 of drum 33 was turned to plunger extended position, normally closed limit switch LS1 is held open throughout the first operative step and consequently the closing of limit switch LS2 is an idle actuation of said switch.

The operator now manually moves the turret slide rearwardly, during which time the work spindle continues to rotate in the forward direction at the speed for the first operative step. Near the end of the rearward movement of the turret slide, the turret 18 is automatically and mechanically indexed from No.1 face to No. 2 face. This indexing of the turret rotates the automatic selector switch 30 to move the contact arm thereof from contact 1 to contact 2. Also, the indexing of the turret indexes drum 33 and since No. 2 knob 38 on said drum was set in the retracted position, normally closed limit switch LS1 which had been held open throughout the first operative step now closes and remains closed throughout the second operative step. This conditions the circuit for motor reversal when limit switch LS2 is closed.

It will be recalled that the preselected speed for the work spindle for the second operative step was in the "low" speed range and that the operator in setting up the machine had turned knob 116 to the "low" speed range position, therefore, contacts 2 in wire 183 are open.

The movement of the contact wiper arm of the automatic selector switch 30 from contact 1 to contact 2 momentarily interrupted the circuit through stepping switch 181 to wire 177 and hence relay coil CR2 was deenergized, whereupon normally closed contacts CR2 in wire 190 closed thus energizing stepping switch relay SR in wire 190. The energization of relay coil SR thus automatically caused all of the movable contact arms of all of the stepping switches to be advanced from contact 1 of said switches to contact 2 thereof, as will be well understood in the art. Inasmuch as the contact arm of the automatic selector switch 30 is now in engagement with the No. 2 contact of said switch, the instant that the contact arm of stepping switch 181 engages its No. 2 contact, relay coil CR2 is energized, thus opening normally closed contacts CR2 in wire 190 and deenergizing relay coil SR, whereupon the movable contact arms of all of the stepping switches remain in engagement with the No. 2 contacts of said switches. Rheostat 94 is connected now through stepping switch banks 136 and 138 with the armature control while rheostat 93 is connected through stepping switch banks 142 and 144 with the field control of the main driving motor 115 and the speed of the motor is varied accordingly. Likewise, when the contact arm of stepping switch bank 188 engaged its No. 2 contact, relay CR1 was not energized since contact 2 in wire 183 is open, therefore, the normally closed contacts CR1 in wire 180 complete the circuit to solenoid 64 while the circuit to solenoid 63 in wire 179 is interrupted because of the normally open contacts CR1 in said wire. Thus "low" speed range solenoid 64 being energized and "high" speed range solenoid 63 being deenergized, clutch member 56 is shifted to disconnect gear 58 from shaft 55 and connect gear 57 to said shaft. The work spindle 13 is now rotating in the forward direction at the preselected speed which is in the "low" speed range.

The operator now manually moves the turret slide forwardly to cause the tool on the No. 2 face of the turret to machine the work piece. Near the end of the forward movement of the slide, the No. 2 stop screw 41 engages block 42 and moves plunger 43 until the movement of said block and the forward movement of the slide is positively arrested by the boss 45. The movement thus imparted to plunger 43 actuates through rod 49, the button of limit switch LS2 and closes said switch. Inasmuch as limit switch LS1 has been held closed throughout the No. 2 step, the momentary closing of limit switch LS2 energizes relay coil CR3, closing contact CR3 in holding circuit 175 around said limit switch LS2, thereby maintaining relay CR3 energized even after switch LS2 has again opened. The energization of relay CR3 opened normally closed contacts CR3 in wire 171 to deenergize the forward contactor coil in said wire and closed normally open contacts CR3 in wire 173 to energize the reverse contactor coil in wire 172. This results in the forward contacts of the motor control being opened and the reverse contacts thereof being closed and, therefore, the motor 15 now operates in the reverse direction, as for instance, in backing off a tap or die.

The operator manually turns the turnstile 19 to move the slide rearwardly whereupon switch LS2 automatically opens and near the end of such movement the turret 18 mechanically and automatically indexes from No. 2 face to No. 3 face. This indexing of the turret indexes drum 33 and since the No. 3 knob 38 was set for the extended position of its plunger 35, normally closed limit switch LS1 is opened and is held open throughout the third operative step. The opening of limit switch LS1 interrupts the circuit to relay coil CR3 through the holding circuit 175 and said relay is deenergized, whereupon normally closed contacts CR3 in wire 171 close and normally open contacts CR3 in wire 173 open, thus energizing the forward contactor coil in wire 171 and deenergizing the reverse contactor coil in wire 172. This results in closing the forward contacts and opening the reverse contacts of the forward and reverse motor control.

The indexing of the turret 18 from No. 2 face to No. 3 face also indexed the automatic selector switch 30 to move the contact arm thereof from No. 2 contact to No. 3 contact. The moment the contact arm left the No. 2 contact, the circuit to relay CR2 in wire 177 through stepping switch bank 181 was interrupted and hence relay CR2 was deenergized, therefore, normally closed contact CR2 in wire 190 closed, energizing relay SR in said wire and automatically moving the contact arms of stepping switch banks 136, 138, 142, 144, 181 and 188 from their No. 2 contacts to their No. 3 contacts. By the time the contact arm of stepping switch 181 reaches its No. 3 contact, the contact arm of the automatic selector switch 30 is in engagement with its No. 3 contact and hence the circuit to relay coil CR2 through stepping switch 181 is established and said relay is energized, causing contacts CR2 in wire 190 to open and deenergizing relay coil SR and thus stopping further actuation of the contact arms of all of the stepping switch banks so that said arms remain in contact with the No. 3 contacts thereof. At this time the preset rheostat 98 is connected through stepping switch banks 136 and 138 with the armature control while the preset rheostat 97 is connected through stepping switch banks 142 and 144 with the field control of the main drive motor.

Also since knob 117 for the third operative step was set in the "high" speed range position, contacts 3 in wire 184 are closed and hence said wire is connected through stepping switch 188 with wire 189 and relay coil CR1 is energized. Energization of relay coil CR1 closes normally open contacts CR1 in wire 179 to energize the "high" speed range solenoid 63 and opens the normally closed contacts CR1 in wire 180 to deenergize the "low" speed range solenoid 164. The clutch member 56 is thus shifted to the "high" speed range position. The work spindle is now rotating in the forward direction at the preselected speed in the "high" speed range for the third operative step.

The operator now manually moves the slide forwardly to perform the machining operation for the third step and until the forward movement of the slide is positively arrested by the engagement of the No. 3 stop screw with the block 42 and the movement of the latter into positive engagement with the boss 45. At this moment, limit switch LS2 is closed but inasmuch as limit switch LS1 is held open during the third operative step, no reversal of the motor occurs. The operator now manually returns the slide to its rear position which effects indexing of the turret from No. 3 face to No. 4 face. The operation of the machine throughout operative steps 4 to 6, inclusive, will occur in a manner similar to that described for steps 1 to 3, inclusive, and it is not thought necessary to specifically describe the subsequent steps.

It will be understood that the machine can be operated with the automatic selector switch through a lesser number of operative steps than the total number of steps of which the machine is capable. In such case, the turret must be indexed through its idle faces after the completion of the last active operative step to bring the No. 1 face thereof into operative position. This idle indexing of the turret may be accomplished by bringing the slide slightly forward and indexing the turret by hand or by rotating the turnstile to move the slide forwardly slightly and then rearwardly to effect turret indexing the required number of times.

It will be understood that had it been desired to effect the transition from one operative step to the next operative step manually as distinguished from automatically, then the operator would have employed the lever 123 for such purpose. When he set the lever 123 in the position corresponding with operative step No. 1, the manual selector switch 124 would have been put in the control circuit and the automatic selector switch 30 cut out of the control circuit. In the manual operation, at the end of each operative step, the operator would shift the lever 123 to move the movable contact arm of the switch 124 from the contact corresponding to the completed operative step and into engagement with the contact of the next operative step, it being understood that the turret is indexed correspondingly. This would have the same effect as the indexing of the contact arm of the automatic selector switch 30 each time the turret 18 was indexed. The manual selector switch 124 would most likely be employed where a single workpiece or a very few workpieces are to be machined, as distinguished from a production run.

It will also be understood that the lever 121 can be manually positioned for reverse motor operation, if desired. This will close the under voltage contacts of switch 122 in wire 169 and the reverse contacts of said switch in wire 172. At the same time the forward contacts in 171 of said switch 122 will be open. The motor 15 under such setting will operate in the reverse direction.

Although a preferred embodiment of the invention has been illustrated and described herein, it will be understood that the invention is susceptible of various modifications and adaptations within the scope of the appended claims.

Having thus described my invention, I claim:

1. In a machine tool having a movable part, a variable speed electric motor operatively connected thereto for moving said part at different rates, and a member indexible at the end of each operative step of the work cycle; the improvement which comprises a control for said motor including a control circuit, separate settable motor speed regulating means for each operative step in the work cycle of the machine, indexible means for successively bringing each of said regulating means into the control circuit during the operative cycle of the machine, operative connections between said indexible means and said indexible member for effecting automatic indexing of said means with said member, a manually rotatable shaft having freely rotatable thereon gears correlated to the different operative steps and with each of said gears operatively interconnected with one of said regulating means, and means for selectively operatively interconnecting said gears with said shaft for setting each of said regulating means to preselect the motor speed and the rate of movement of said part for each operative step of the work cycle.

2. In a machine tool having a movable part, a variable speed D. C. motor operatively connected thereto for moving said part at different rates, and a member indexible at the end of each operative step of the work cycle; the improvement which comprises a control for said motor including a control circuit, a pair of rotatably and simultaneously settable rheostats for each operative step in the work cycle of the machine, one of the rheostats of each pair being a field control rheostat and the other being an armature control rheostat, indexible means for successively bringing each pair of rheostats into the control circuit during the operative cycle of the machine, operative connections between said indexible means and said indexible member for effecting automatic indexing of said means with said member, a manually rotatable shaft having freely rotatable thereon gears correlated to the different operative steps and each operatively connected with a pair of rheostats, and means for selectively interconnecting said gears to said shaft for rotation therewith for setting the rheostats of each pair of rheostats to preselect the motor speed and the rate of movement of said part for each operative step of the work cycle.

3. A machine tool as defined in claim 1 and wherein an indicator mechanism is operatively connected to said shaft and is controlled by the rotation thereof for indicating when each regulating means has been set to preselect the desired motor speed and rate of movement of said part for each operative step.

4. A machine tool as defined in claim 2 and wherein an indicating mechanism is operatively connected with said shaft and is controlled by the rotation thereof to indicate when each pair of rheostats has been set to preselect the desired motor speed and rate of movement of said part for each operative step.

5. In a machine tool having a movable part, a variable speed electric motor operatively connected thereto for moving said part at different rates, and a member indexible at the end of each operative step of the work cycle; the improvement which comprises a control for said motor including a control circuit, separate settable motor speed regulating means for each operative step in the work cycle of the machine, indexible means for successively bringing each of said regulating means into the control circuit during the progression of the successive operative steps of the work cycle of the machine, operative connections between said indexible means and said indexible member for effecting automatically indexing of said means with said member, a manually rotatable shaft having freely rotatable thereon gears correlated to the different operative steps and with each of said gears operatively interconnected with one of said regulating means, means for selectively operatively interconnecting said gears with said shaft for setting each of said regulating means to preselect the motor speed and the rate of movement of said part for each operative step of the work cycle, and an electrical indicating mechanism electrically connected to the control circuit and operatively connected to said shaft and controlled by the rotation of the latter for indicating when each regulating means has been set to preselect the desired motor speed and rate of movement of said part for each operative step.

6. In a machine tool having a movable part, a variable speed D. C. motor operatively connected thereto for moving said part at different rates, and a member indexible at the end of each operative step of the work cycle; the improvement which comprises a control for said motor including a control circuit, a pair of rotatably and simultaneously settable rheostats for each operative step in the work cycle of the machine, one of the rheostats of each pair being a field control rheostat and the other being an armature control rheostat, indexible means for successively bringing each pair of rheostats into the control circuit during the progression of the successive operative steps of the work cycle of the machine, operative connections between said indexible means and said indexible member for effecting automatically indexing of said means with said member, a manually rotatable shaft having freely rotatable thereon gears correlated to the different operative steps and each operatively connected with a pair of rheostats, means for selectively interconnecting said gears to said shaft for rotation therewith for setting the rheostat of each pair of rheostats to preselect the motor speed and the rate of movement of said part for each operative step of the work cycle, and an electrical indicating mechanism electrically connected to said control circuit and operatively connected with said shaft and controlled by the rotation of the latter to indicate when each pair of rheostats has been set to preselect the desired motor speed and rate of movement of said part for each operative step.

7. In a machine tool having a movable part, a variable speed electric motor operatively connected thereto for moving said part at different rates, and a member indexible upon the completion of each operative step of the work cycle of the machine; the improvement which comprises a control for said motor including a control circuit, a separate settable motor speed regulating means for each operative step in the work cycle, indexible means for successively bringing each of said separate regulating means into the control circuit in correlation to the operative steps of the work cycle and for cutting out of the control circuit the remainder of said separate regulating means, operative connections between said indexible member and said indexible means and effecting automatic indexing of said means with said member at the end of each operative step of the work cycle of the machine to cut out of the control circuit the regulating means correlated to the finished operative step and to bring into the control circuit the regulating means correlated to the next operative step, and mechanical means for setting each of said regulating means prior to commencing a work cycle to preselect the motor speed and the rate of movement of said part for each of the operative steps of the work cycle.

8. The improvement in a machine tool as defined in claim 7 and wherein said indexible means includes a multi contact switch having the contacts thereof correlated to the operative steps of the work cycle, separate electrical connections between said contacts and the corresponding separate regulating means, and a movable contact arm in said control circuit and successively engaging said contacts as the indexible member is indexed at the end of the operative steps during the work cycle.

9. The improvement in a machine tool as defined in claim 7 and wherein there is provided manually controlled means for rendering said indexible means inactive and for successively bringing each of said regulating means into the control circuit as the successive operative steps of the work cycle are completed and including a multi contact manually actuated switch.

10. In a machine tool having a movable part, a variable speed direct current electric motor operatively connected thereto for moving said part at different rates, and a member indexible upon the completion of each operative step of the work cycle of the machine; the improvement which comprises a control for said motor including a control circuit, a separate settable pair of motor speed regulating means for each operative step in the work cycle with one of the regulating means of each pair controlling the field voltages of said motor and the other regulating means thereof controlling the armature voltages thereof, indexible means for successively bringing each pair of regulating means into the control circuit in correlation to the operative steps of the work cycle and for cutting out of the control circuit the remainder of said separate pairs of regulating means, operative connections between said indexible member and said indexible means and effecting automatic indexing of said means with said member at the end of each operative step of the work cycle of the machine to cut out of the control circuit the pair of regulating means correlated to the finished operative step and to bring into the control circuit the pair of regulating means correlated to the next operative step, and mechanical means for setting each pair of regulating means prior to commencing a work cycle to preselect the motor speed and the rate of movement of said pair for each of the operative steps of the work cycle.

11. In a machine tool having a movable part, a variable speed electric motor operatively connected thereto for moving said part at different rates, and a member indexible upon the completion of each operative step of the work cycle of the machine; the improvement which comprises a control for said motor including a control circuit, a separate settable motor speed regulating means for each operative step in the work cycle, indexible means for successively bringing each of said separate regulating means into the control circuit in correlation to the operative steps of the work cycle and for cutting out of the control circuit the remainder of said separate regulating means, operative connections between said indexible member and said indexible means and effecting an automatic indexing of said means with said member at the end of each operative step of the work cycle of the machine to cut out of the control circuit the regulating means correlated to the finished operative step and to bring into the control circuit the regulating means correlated to the next operative step, a manually rotatable shaft, driving elements freely rotatable on said shaft and correlated to the different operative steps of the work cycle, an operative connection between each driving element and its related regulating means, and means for selectively operatively interconnecting said elements with said shaft for setting each of said regulating means prior to the commencement of a work cycle of the machine to preselect the motor speed and the rate of movement of said part for each of the operative steps of the work cycle.

12. The improvement defined in claim 11 and wherein an indicator mechanism is operatively connected to said shaft and is controlled by the rotation thereof for indicating when each separate regulating means has been set to preselect the desired motor speed and rate of movement of said part for each operative step.

13. In a machine tool having a movable part, a variable speed direct current electric motor operatively connected thereto for moving said part at different rates, and a member indexible at the end of each operative step of the work cycle; the improvement which comprises a control for said motor including a control circuit, a separate pair of rotatably and simultaneously settable rheostats for each operative step in the work cycle, one of the rheostats of each pair being a field voltage control rheostat and the other being an armature voltage control rheostat, indexible means for successively bringing each pair of rheostats into the control circuit in correlation to the operative steps of the work cycle and for cutting out of the control circuit the remainder of said pairs of rheostats, operative connections between said indexible member and said indexible means and effecting automatic indexing of said means with said member at the end of each operative step of the work cycle of the machine to cut out of the control circuit the pair of rheostats correlated to the finished operative step and to bring into the control circuit the pair of rheostats correlated to the next operative step, a manually rotatable shaft, driving elements freely rotatable thereon and correlated to the different operative steps, operative connections between each driving element and its respective pair of rheostats, and means for selectively interconnecting said elements to said shaft for rotation therewith for selectively setting the rheostat of each pair of rheostats to preselect the motor speed and the rate of movement of said part for each operative step of the work cycle.

14. The improvement defined in claim 13 and wherein an indicating mechanism is operatively connected with said shaft and is controlled by the rotation thereof to indicate when each pair of rheostats has been set to preselect the desired motor speed and rate of movement of said part for each operative step.

ROBERT HAROLD CLARK.

References Cited in the file of this patent

UNITED STATES PATENTS

| Number | Name | Date |
|---|---|---|
| 921,984 | Hanson | May 18, 1909 |
| 1,042,444 | James | Oct. 29, 1912 |
| 1,056,332 | Hartness et al. | Mar. 18, 1913 |
| 1,269,489 | Murphy | June 11, 1918 |
| 1,796,332 | Johnson | Mar. 17, 1931 |
| 1,968,174 | Schnabel | July 31, 1934 |
| 2,029,335 | Oberhoffken et al. | Feb. 4, 1936 |
| 2,405,686 | Clark | Aug. 13, 1946 |
| 2,528,299 | Clark | Oct. 31, 1950 |